US010055562B2

(12) United States Patent
Lerner et al.

(10) Patent No.: US 10,055,562 B2
(45) Date of Patent: Aug. 21, 2018

(54) TECHNIQUES FOR IDENTIFYING A CHANGE IN USERS

(71) Applicant: Intel Corporation, Santa Clara, CA (US)

(72) Inventors: Anna Lerner, Gan Yavne (IL); Alex Nayshtut, Gan Yavne (IL); Tomer Rider, Naahryia (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/060,927

(22) Filed: Oct. 23, 2013

(65) Prior Publication Data
US 2015/0113631 A1 Apr. 23, 2015

(51) Int. Cl.
*G06F 21/32* (2013.01)
*G06F 21/53* (2013.01)
*H04W 12/06* (2009.01)

(52) U.S. Cl.
CPC .............. *G06F 21/32* (2013.01); *G06F 21/53* (2013.01); *H04W 12/06* (2013.01)

(58) Field of Classification Search
CPC .......... G06F 21/13; G06F 21/53; G06F 21/83; G06F 21/32; G06F 21/83
USPC ........................................................... 726/16
See application file for complete search history.

(56) References Cited

U.S. PATENT DOCUMENTS

| 8,411,140 B2* | 4/2013 | Adelson | A61B 5/1172 |
| | | | 348/135 |
| 9,147,061 B1* | 9/2015 | McClendon | G06F 21/32 |
| 2002/0065802 A1* | 5/2002 | Uchiyama | G06F 17/30867 |
| 2002/0130841 A1* | 9/2002 | Scott | G06F 3/0213 |
| | | | 345/166 |
| 2005/0060532 A1 | 3/2005 | Dorenbosch et al. | |
| 2005/0178827 A1* | 8/2005 | Shatford | G06K 9/00026 |
| | | | 235/380 |
| 2006/0132315 A1* | 6/2006 | Kurtz | G06F 21/32 |
| | | | 340/573.1 |
| 2006/0230286 A1* | 10/2006 | Kitada | 713/186 |
| 2007/0079355 A1* | 4/2007 | Chand | G05B 19/054 |
| | | | 726/2 |
| 2008/0170123 A1* | 7/2008 | Albertson | A63B 24/0003 |
| | | | 348/157 |
| 2008/0231461 A1* | 9/2008 | Sanchez | G08B 21/06 |
| | | | 340/575 |
| 2009/0084612 A1* | 4/2009 | Mattice et al. | 178/18.04 |

(Continued)

FOREIGN PATENT DOCUMENTS

CN 101470800 A 7/2009
WO WO2014107793 * 7/2014

OTHER PUBLICATIONS

International Search Report and Written opinion received for PCT Patent Application No. PCT/US2014/056092, dated Dec. 12, 2014, 11 pages.

(Continued)

*Primary Examiner* — Eleni A Shiferaw
*Assistant Examiner* — Shahriar Zarrineh

(57) ABSTRACT

Various embodiments are generally directed to an apparatus, method and other techniques for detecting an input comprising an object contacting a surface of an apparatus, determining object characteristics based on the detected input and selecting a user profile based on the determined object characteristics.

17 Claims, 9 Drawing Sheets

(56) References Cited

U.S. PATENT DOCUMENTS

| | | | | |
|---|---|---|---|---|
| 2009/0109180 A1* | 4/2009 | Do et al. | | 345/173 |
| 2009/0150994 A1* | 6/2009 | Evans | | G06F 21/32 |
| | | | | 726/20 |
| 2009/0165145 A1* | 6/2009 | Haapsaari | | H04M 1/72563 |
| | | | | 726/28 |
| 2009/0294523 A1* | 12/2009 | Marano | | G06F 21/31 |
| | | | | 235/380 |
| 2010/0158327 A1* | 6/2010 | Kangas | | G06F 21/316 |
| | | | | 382/124 |
| 2010/0303343 A1* | 12/2010 | Lee | | G06K 9/00268 |
| | | | | 382/159 |
| 2011/0053574 A1 | 3/2011 | Rice | | |
| 2011/0093100 A1* | 4/2011 | Ramsay | | G06F 3/011 |
| | | | | 700/94 |
| 2011/0130635 A1* | 6/2011 | Ross | | A61B 5/0816 |
| | | | | 600/301 |
| 2011/0140840 A1 | 6/2011 | Hardacker et al. | | |
| 2011/0197263 A1* | 8/2011 | Stinson | | G06F 3/011 |
| | | | | 726/4 |
| 2011/0210931 A1* | 9/2011 | Shai | | G06F 3/014 |
| | | | | 345/173 |
| 2011/0275412 A1* | 11/2011 | Khawand | | 455/566 |
| 2012/0030596 A1 | 2/2012 | Hanes | | |
| 2012/0116176 A1* | 5/2012 | Moravec et al. | | 600/300 |
| 2012/0159330 A1* | 6/2012 | Jeong | | G06F 3/017 |
| | | | | 715/716 |
| 2012/0167170 A1* | 6/2012 | Shi et al. | | 726/2 |
| 2012/0204257 A1* | 8/2012 | O'Connell | | G06Q 30/06 |
| | | | | 726/19 |
| 2012/0280917 A1* | 11/2012 | Toksvig et al. | | 345/173 |
| 2012/0306758 A1* | 12/2012 | Marsden et al. | | 345/168 |
| 2012/0309515 A1* | 12/2012 | Chung | | H04N 21/274 |
| | | | | 463/31 |
| 2013/0070977 A1* | 3/2013 | Orandi | | G06K 9/00013 |
| | | | | 382/124 |
| 2013/0097416 A1* | 4/2013 | Barra | | G06F 9/4451 |
| | | | | 713/100 |
| 2013/0097695 A1* | 4/2013 | Sipe et al. | | 726/17 |
| 2013/0145295 A1* | 6/2013 | Bocking | | G06F 3/017 |
| | | | | 715/764 |
| 2013/0154991 A1* | 6/2013 | Yilmaz | | G06F 3/044 |
| | | | | 345/174 |
| 2013/0211669 A1 | 8/2013 | DePetro | | |
| 2013/0288647 A1* | 10/2013 | Turgeman | | 455/411 |
| 2013/0322709 A1* | 12/2013 | Irani et al. | | 382/124 |
| 2013/0333020 A1* | 12/2013 | Deshpande | | G06F 21/36 |
| | | | | 726/16 |
| 2013/0346546 A1* | 12/2013 | Jung | | 709/217 |
| 2014/0153790 A1* | 6/2014 | Algreatly | | G06F 3/041 |
| | | | | 382/124 |
| 2014/0226131 A1* | 8/2014 | Lopez | | G06F 1/1626 |
| | | | | 351/210 |
| 2014/0283005 A1* | 9/2014 | Avni | | G06F 21/64 |
| | | | | 726/16 |
| 2014/0310277 A1* | 10/2014 | Ricci | | 707/736 |
| 2015/0020191 A1* | 1/2015 | Vida et al. | | 726/17 |
| 2015/0026719 A1* | 1/2015 | Menon | | H04N 21/2668 |
| | | | | 725/34 |
| 2016/0086186 A1* | 3/2016 | Candelore | | G06Q 20/352 |
| | | | | 705/44 |
| 2016/0208862 A1* | 7/2016 | Kubota | | F16D 3/12 |
| 2016/0210451 A1* | 7/2016 | Hwang | | G06F 21/316 |
| 2016/0239652 A1* | 8/2016 | Wang | | G06F 21/31 |

OTHER PUBLICATIONS

Search report received for Chinese Patent Application No. 201480052260.1, dated Jan. 19, 2018, 2 pages.

* cited by examiner

600

DETECT AN INPUT COMPRISING A OBJECT CONTACTING A SURFACE OF AN APPARATUS
605

DETERMINE OBJECT CHARACTERISTICS BASED ON THE DETECTED INPUT
610

SELECT A USER PROFILE BASED ON THE DETERMINED OBJECT CHARACTERISTICS
615

*FIG. 6*

TECHNIQUES FOR IDENTIFYING A CHANGE IN USERS

TECHNICAL FIELD

Embodiments described herein generally relate to detecting user characteristics on a computing device. More specifically, embodiments are generally directed to enabling, disabling and switching between user profiles based on detected user characteristics.

BACKGROUND

Computing devices are becoming an integral part of both people's business lives and personal lives. In some situations the same device may be used by different users. For example, a father or mother may use a computing device for business purposes during the day and a child may use the computing device to play games at night. In some situations, an owner of the device may desire to limit access to certain applications and features of the device. For example, restrictions to business applications and settings may be desired such that a child does not send out a work email or order new computers.

BRIEF DESCRIPTION OF THE DRAWINGS

FIG. 6 illustrates an embodiment of a fourth logic flow diagram for a user detecting a change in users.

DETAILED DESCRIPTION

Figure 1:
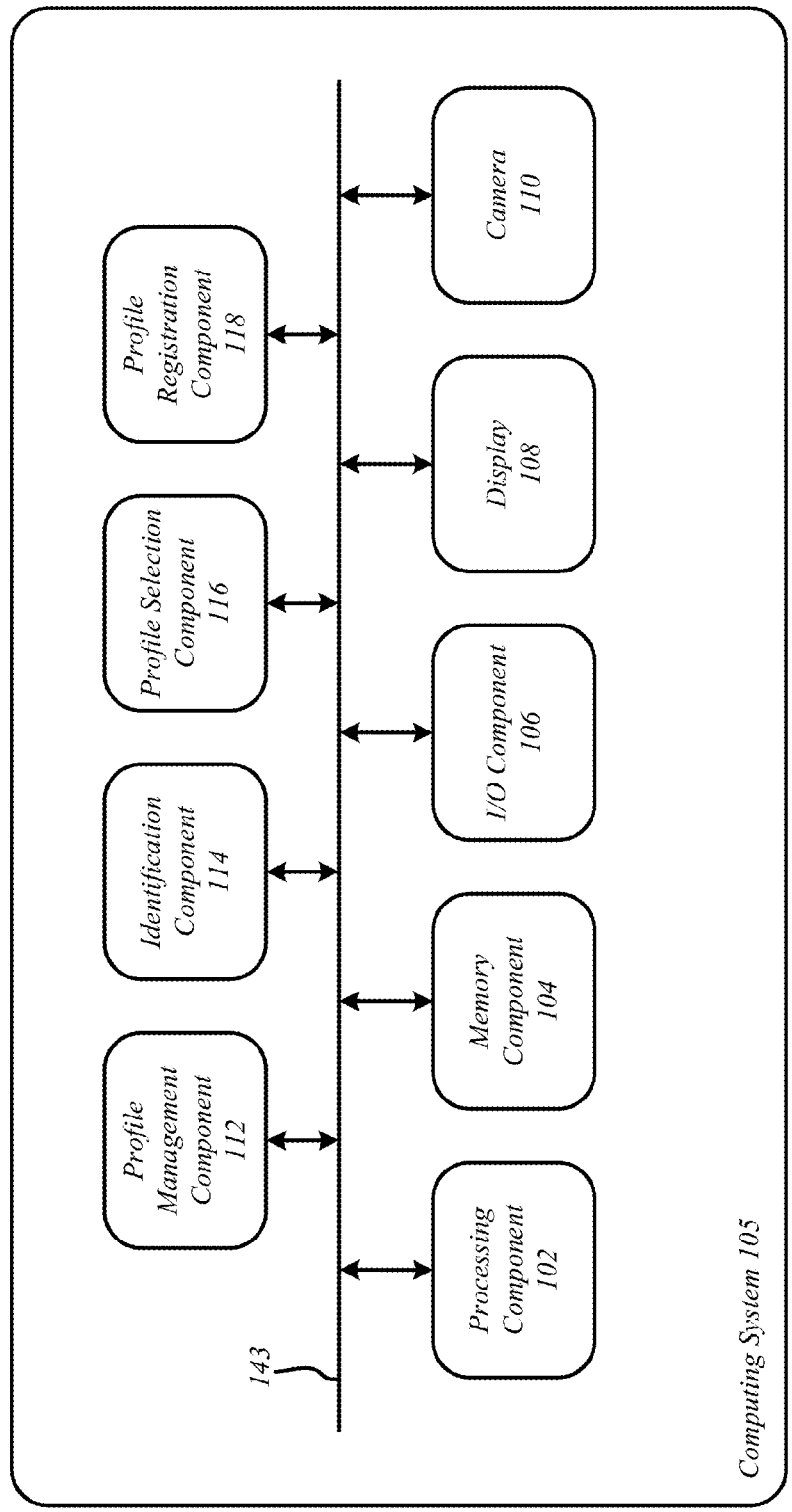
FIG. 1 illustrates an embodiment of a first user identification system.

Various embodiments are generally directed to identifying a user of a computing device and enabling a user profile based on the identified user. In some embodiments, a user may interact with the device via a touchscreen display or touchscreen sensor and object characteristics based on the detected contact may be recognized or determined. For example, a user may touch or contact the touchscreen display and object characteristics such as a size of a digit, minutiae points of a fingerprint, a thermal characteristic of the contact, a movement of the contact, and a direction of the contact may be determined.

In some embodiments, the object characteristics may be used to enable a user profile associated with the user or enable a guest user profile if the user is not registered on the computing device. Each user profile may be configured such that a user only has access to particular applications and features while operating the device. The computing device may automatically and seamlessly switch between user profiles based on detected contacts with a touchscreen display or sensor. For example, the owner may interact with the device for business purposes during the day and then a child may interact with the device to play games a night. In various embodiments, the computing device will recognize the child interacting with the device based on the object characteristic and enable an associated user profile or a guest user profile. The different profiles may limit the child from accessing certain applications and features such as business applications so that he or she does not send out an email to a business associate or order computers on a business account.

In some embodiments, the determination in the change of users may not be specific enough to determine if the new user is associated with a user profile based on the object characteristics. In this instance, the computing device may automatically switch to a guest user profile and require the user to input further authentication information such as a password, passkey, password pattern, voice information, biometric information including iris information, facial characteristics and/or fingerprint characteristics. The computing device may determine if the new user has an associated user profile based on one or more additional authentication information inputs and change to the associated user profile. If the user is still not authenticated the user may continue to use the device under the guest user profile.

In some embodiments, a change in users may be detected and the user profile may automatically switch to the guest profile without any additional authentication information required. The computing device may continue to operate in the guest user profile until a time period has expired or until a new user is detected. Various embodiments and details are further disclosed in the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of a computing system, in particular, computing system 105 for detecting or identifying a change in users. In various embodiments, computing system 105 may be representative of a computing system suitable for use with one or more embodiments described herein, such as, logic flow 200 of FIG. 2A, logic flow 250 of 2B, logic flow 300 of FIG. 3, logic flow 400 of FIG. 4, logic flow 600 of FIG. 6, and/or system 700 of FIG. 7.

In various embodiments, computing system 105 may be any type of computing device including a mobile computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context. In some embodiments, computing system 105 may also be a vehicle navigation system, vehicle infotainment system, embedded in home appliances, etc.

As shown in FIG. 1, computing system 105 may include multiple elements. One or more elements may be implemented using one or more circuits, components, registers, processors, software subroutine modules, or any combination thereof, as desired for a given set of design or performance constraints. Although FIG. 1 shows a limited number of elements in a certain topology by way of example, it can be appreciated that more or less elements in any suitable topology may be used in computing system 105 as desired for a given implementation. The embodiments are not limited in this context.

In various embodiments, computing system 105 may include a processing component 102. Processing component 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing component 102 may be connected to and communicate with the other elements and components of the computing system via an interconnect 143, such as one or more buses, control lines, and data lines.

In one embodiment, computing system 105 may include a memory component 104 to couple to processing component 102. In various embodiments, the memory component 104 may store data and information for the user identification system. For example, the memory component 104 may store and maintain one or more user profiles, guest user profiles, permission settings, access settings, finger characteristics, facial characteristic, or any other type of information related to detecting a change in a user and/or identifying a user of a device.

Memory component 102 may be coupled to processing component 102 via interconnect 143, or by a dedicated communications bus between processing component 102 and memory component 102, as desired for a given implementation. Memory component 102 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory component 104 can store instructions and data momentarily, temporarily, or permanently. The memory component 104 may also store temporary variables or other intermediate information while the processing component 102 is executing instructions. The memory component 104 is not limited to storing the above discussed data and may store any type of data.

The computing system 105 may include input/output (I/O) component 106 having at least one of an input device or sensor, such as one or more buttons, a keyboard, a keypad, a touchscreen display, a touch sensitive device, a microphone, a biometric finger printer reader, biometric eye scanner or any other device used for inputting information into computing system 105. Moreover, the I/O component 106 may be a sensor including any hardware or logic to detect one or more touches or inputs on or near a housing of the apparatus, a display of the apparatus including a touchscreen or touch sensitive display. The one or more inputs may occur separately, simultaneously and/or sequentially. The I/O component 106 monitors touches that occur on the housing or display and produces signals indicative thereof.

In various embodiments, the I/O component 106 or sensor may detect a contact with a surface of the computing device 106 such as a touchscreen display and contact information based on the contact may be generated by the I/O component 106. The contact information may include details such as the location of the contact including coordinates of the endpoints of the contact, fingerprint information, thermal information of the contact, movement information of the contact, direction information or the contact, etc. In one example, the I/O component 106 may detect an object such as a user's digit contacting a surface and determine the coordinates in a two-dimensional (2D) screen space for the edges of the digit and or contact. The I/O component 106 may also detect a contact from other objects such as a stylus and generate contact information based on this contact. The contact information may be sent to identification component 114, or any other component for further processing.

The I/O component 106 may be used to input any information or data into the computing system 105. For example, the I/O component 106 may detect one or more inputs via a user's digit touching or contacting a surface of the apparatus including the display or housing. The I/O component 106 may also be used to input any type of data or information including user profile information, registration information, settings information, permission information, etc.

In various embodiments, the I/O component 106 may include one or more components to output information to a user. For example, the I/O component 106 may include a speaker to output an audible noise or a haptic feedback device to output a vibration. The I/O component 106 may be located any within or on computing system 105, or may be separate and connected to the computing system 105 via a wired or wireless connection.

In embodiments, the computing system 105 may include a display component 108. Display component 108 may constitute any display device capable of displaying information received from processing component 102. The display component 108 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display component 108 may display a User interface (UI) or a Graphical User Interface (GUI) associated with controlling functionality of the computing system 105. The computer device may include two or more display units, according to various embodiments. The display component 108 may display any information or data associated computing system 105.

In various embodiments, computing system 105 includes a camera 110 and camera circuitry to capture, receive or detect image information. Camera 110 may be any type of camera including a still photo camera and/or a video camera capable of capturing image information. In various embodiments, the camera 110 may send the image information and/or facial information to the other components of the computing system 105 for further processing, as will be explained in more detail below.

In embodiments, computing system 105 may include a profile management component 112 to manage one or more user profiles. The user profiles may be associated with a user as an associated user profile or may be a guest user profile. An associated user profile may be enabled when a profile selection component 116 determines that the user of the computing system 105 has a user profile based on detected or determined object characteristics and/or authentication information. In some embodiments, a guest user profile may be enabled when the profile selection component 116 determines that the user of computing system 105 does not have a user profile based on detected or determined object characteristics and/or authentication.

In some embodiments, the profile management component 112 may add, delete, or modify user profiles based on information or an input received via an input device such as I/O component 106. For example, a user may create a new user profile via a keyboard or some other input device via a user interface such as a graphical user interface (GUI). The user may also modify or delete existing user profiles via the input device.

In various embodiments, each user profile may include settings for preferences and access permissions that may be configured and enabled while the user profile is enabled on the computing system 105. For example, settings for a graphical user interface (GUI) environment, GUI layout, ring tones, vibrations, input/output preferences, short message service (sms) clients, multimedia message service (mms) clients, email clients and any other preferences may be configured for each of the user profiles including the guest user profile.

In addition, access permissions may be set for each of the user profiles including the guest user profile. For example, access to particular applications, email clients, sms/mms clients, telephone clients, etc. may be configure for each user profile. In addition, access to certain features may also be configured or enabled/disabled for each user profile including emailing, text messaging, telephonic capabilities, camera capabilities or any other feature of the computing system 105. For example, a user using may be using an associated user profile or using the guest user profile and may only be able to access certain applications, such as games and multimedia applications. Other applications such as business applications and an email client may be disabled for the user based on the user profile enabled. In another example, a user may only be able to access certain features of the device including changing setting and managing user profiles based on the user profile enabled.

In some embodiments, the profile management component 112 may associate a user profile with a user based on object characteristics and authentication information generated during a registration process. For example, a user may register on the computing system 105 via the registration component 118 by inputting one or more contacts via digits to generate object characteristics. The object characteristics may then be associated with a user profile to generate an associated user profile. For example, a user may create object characteristics for each one his or her digits on both hands which may then be associated with a user profile via the profile management component 112. More specifically, a user having the correct access permissions may associate a particular user profile with particular object characteristics via an input device. The profile management component 112 may also associate facial characteristics and other authentication information with a user profile. For example, facial characteristics may be generated based on image information received from camera 110 and may be associated with a user profile. In addition, other authentication information such as such as a password, passkey, password pattern, voice information, etc. with a user profile. e.

In some embodiments, a user having the correct access permissions may interact with the profile management component 112 utilizing a graphical user interface (GUI). For example, a GUI may illustrate various user profiles and stored object characteristics and authentication information such that a user may associate the characteristics and information with a user profile via an input device. The GUI may also include menus, tabs, etc. to permit a user to generate, modify and delete user profiles. Various embodiments are not limited in this manner and a user may be able to interact with the profile management component 112 via other means including voice commands and text commands.

Computing system 105 may also include an identification component 114 for identifying characteristics and authentication information of a user. As previously discussed, the identification component 114 may receive information such as contact information from I/O component 106 based on a user or object contacting a surface of the computing system 105. The contact information may include details of the contact such as size of the input including coordinates of the endpoints or edges of the contact, fingerprint information, thermal information, movement information, direction information, etc.

In some embodiments, the identification component 114 may use the contact information to generate information including object characteristics. The object characteristics may include digit characteristics such as a size of a digit based on the size of the contact. For example, the size of contact which may be calculated from the coordinates of the endpoints or edges of the contact to determine a size of the digit such as a finger, a thumb, fingertip and/or thumb tip. The size of the digit may include a digit length, digit width and/or a digit area. The digit length may be the measurement of the contact lengthwise, the digit width may be the measurement of the contact widthwise, and the digit area may be area of the contact. In some embodiments, the object characteristics may also include other information such as minutiae points of a fingerprint, a thermal characteristic of the contact, a movement of the contact, and a direction of the contact. In some embodiments, the identification component may send or communicate the object characteristics to other components including the profile management component 112, profile selection component 116, and the profile registration component 118.

In some embodiments, the identification component 114 may receive authentication information including a password, passphrase, password pattern, voice authentication information, and/or biometric authentication information such as a fingerprint, iris scan or facial image information may be associated with a user profile. For example, the identification component 114 may receive the facial image information and generate facial characteristics for facial recognition. More specifically, the identification component 114 may receive an image of a user's face or head and determine feature points of the user's nose, mouth, ears, eyes, etc. The facial characteristics including the feature points may be used to authenticate a user of the computing system 105. However various embodiments are not limited in this manner and any of the authentication information may be used to authenticate a user of the computing system 105. The identification component 114 may send or communicate the authentication information to any of the other components including the profile management component 112, profile selection component 116, and the profile registration component 118.

In various embodiments, the computing system 105 may include a profile selection component 116 for determining a change in users, selecting a user profile and/or authenticating a user. The profile selection component 116 may determine a change in users of the computing system 105 via comparison between object characteristics and previously received object characteristic generated from a previous input. The profile selection component 116 may determine a change in users based on a change factor generated from the comparison. If the change factor is above a predetermined change threshold, the profile selection component 116 may generate information indicating that a change in users has occurred.

By way of example, a user may contact a surface and contact information based on the contact may be generated. Further, object characteristics may be determined based on the contact information. For example, the size of the contact and/or digit may be determined based on the contact information. The size of the contact may then be compared to a previous contact's object characteristics having a size of the contact. A determination may be made as to whether the size of the current contact is greater than the size of the contact of the previous contact. If a change has occurred and if it is greater than a predetermined threshold, a change in users will be indicated. For example if the predetermined change threshold is 10% and the change factor is greater than or equal to 10% a change in users will be indicated. However, if the change factor is less than 10% a change will not be indicated.

In various embodiments, the predetermined change threshold may be set or configured such that a change in users is detected but a user may not be identified by the object characteristics. For example, the predetermined change threshold may be set to a lower percentage than required to identify a particular user. In this example, the profile selection component 116 will only detect that a different user is using the computing system 105 and may automatically and seamlessly enable a guest user profile. However, various embodiments are not limited in the manner and the predetermined change threshold may be set at any percentage or number.

In some embodiments, the profile selection component 116 may determine a change in users based on other characteristics received from the I/O component 106 and/or the identification component 114 such as a change in a person's height or a change in a voice characteristic. For example, I/O component 106 may include an altitude sensor to determine a change in altitude of the computing device 105. In various embodiments, the change in altitude may indicate that a change of users has occurred. For example, an adult at one height may hand the device to child of a different height. The computing device 105 may detect this change in height and determine that a change of users has occurred.

In another example, the profile selection component 116 may determine a change in users based on a change in voice characteristics. For example, the I/O component 106 may include a microphone to receive one or more voice inputs and generate voice characteristics. The profile selection component 116 may detect a change in voice characteristics based on a closest voice or sound received by the I/O component 106. Based on this information, the profile selection component 116 may determine that a change of users as occurred.

In some embodiments, the profile selection component 116 may select a user profile based on the received object characteristics if the object characteristics are sufficient to identify a particular user. For example, in some embodiments, the object characteristics received from the identification component may be sufficient to identify a user based on a comparison between the object characteristics and stored object characteristics. The comparison may be used to generate a selection factor and a user profile may be selected based on the selection factor greater than or equal to a profile selection threshold.

For example, a comparison between the received object characteristics and the stored object characteristics may indicate a selection factor of 90%. Meaning that the difference between the received object characteristics and the stored characteristics 10% or the received object characteristics and the stored characteristics are 90% similar. Further if the predetermined change threshold is 90% or less, then the associated user profile for the stored object characteristics will be chosen.

In some embodiments, the profile selection component 116 may require that a user enter additional authentication information to determine if the user has an associated user profile. For example, a user may input image information via the camera 110 and facial characteristics may be determined based on the image information. The facial characteristics may be compared to stored facial characteristics to determine if a match has occurred. As previously discussed, a match may occur when a selection factor based on the comparison between the received facial characteristics and stored characteristics is above a predetermined selection threshold. Various embodiments are not limited in this manner, and other authentication methods may be used including passwords, passkey, voice information, etc.

When the profile selection component 116 determines that the object characteristics and/or authentication information matches stored characteristics and/or information, the profile selection component 116 may select and enable a user profile associated with the stored characteristics and the user. A user profile associated with a user is referred to as an associated user profile. Various user profiles may be associated with one or more users and user profiles need not be associated with any particular user. In the case where a user does not have an associated user profile or if the profile selection component 116 cannot determine a match between received characteristics/information and stored characteristics/information, a guest user profile may be enabled.

In some embodiments, the computing system 105 may include a profile registration component 118. The profile registration component 118 may be used to register a user for the computing system 105. A registration process may be enabled by a user having the correct access permissions to generate object characteristics and authentication information for a new user and to associate the characteristics and information with the a user profile to generate an associated user profile via the profile management component 112, as previously discussed.

In one example, during the registration process, a user may enter a touch input via the I/O component 106 using one of his/her digits. The identification component 114 may then generate object characteristics for the input and the profile management component 112 may associate the object characteristics with a particular user profile to generate an associated user profile. A user may enter an input for each one of his or hers digits to generate separate object characteristics for association with the particular user profile. Thus, the computing system 105 is able to detect a change of users independent of which digit the user uses.

In another example, authentication information such facial characteristics may also be generated and associated with a particular user profile during the registration process. The camera 110 may be used to take an image of a user's face and the identification component 114 may generate facial characteristics based on image information received from the camera 110. The facial characteristics may be associated with a particular user profile by the profile management component 112. A user may have one or both, object characteristics, facial characteristics and any other type of authentication information, associated with a user profile.

In some embodiments, the registration component 118 may register a user or owner of the computing system 105 as a learned behavior and not during a registration process. For example, the registration component 118 may receive object characteristics from the identification component 114 while a user is operating the device. The registration component 118 may determine that over a particular number of consecutive inputs the object characteristics have remained the same or similar. The registration component 118 may then associate the current settings, permissions and environment to generate an associated user profile associated with the current user of the computing device. In various embodiments, the particular number of consecutive inputs for generating an associated may be predetermined by a user, owner or administrator of the computing system 105. Moreover, the particular number of consecutive inputs may be any number to ensure that the same user has been using the computing system 105.

Figure 2A:
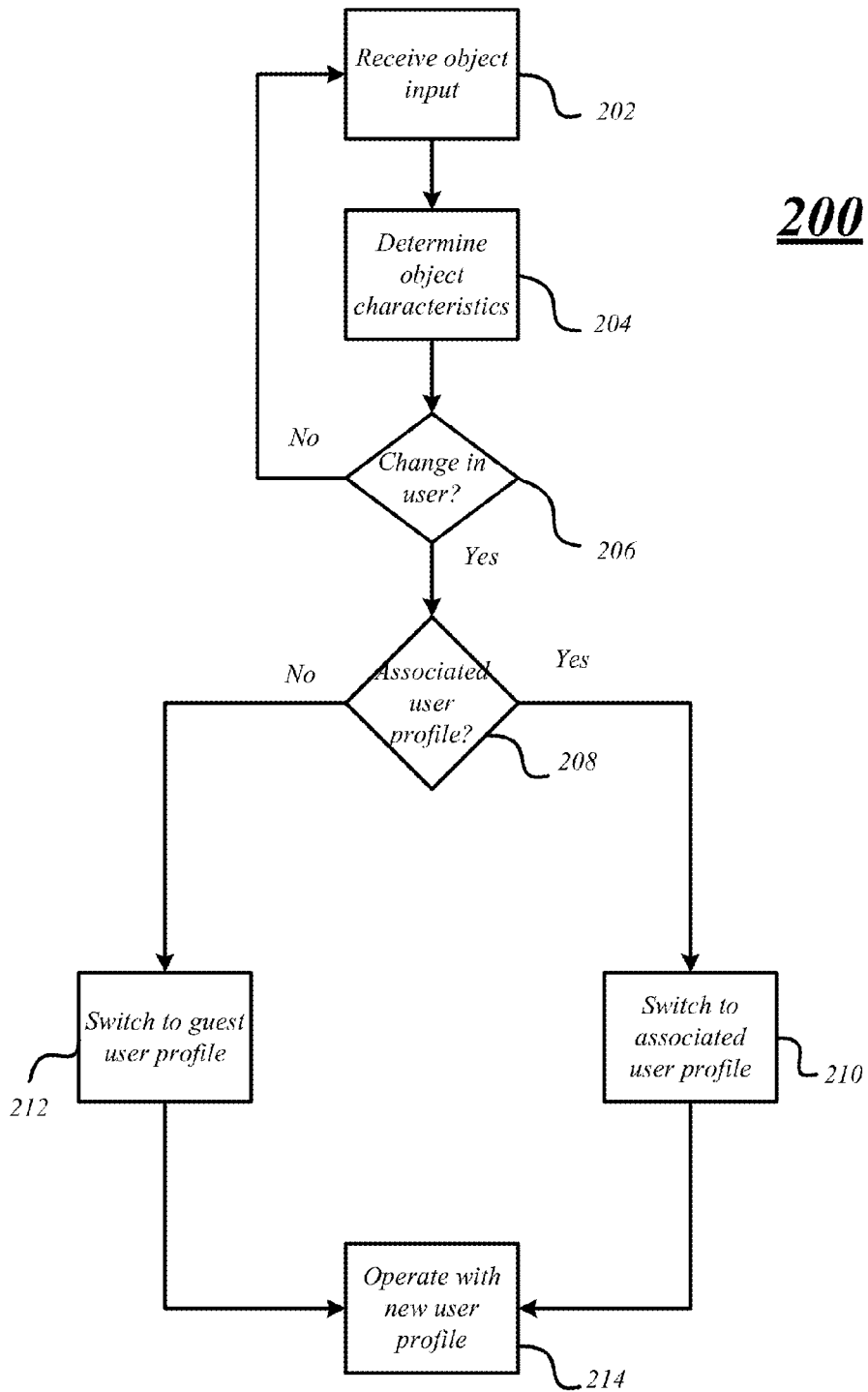
FIG. 2A illustrates an embodiment of a first logic flow diagram for detecting a change in users.

FIG. 2A illustrates an embodiment of a logic flow diagram 200 for determining a change in users. For clarity purposes, the logic flow is discussed with reference to system 100 of FIG. 1. At block 202, an input is received via the I/O component 106. In some embodiments, the input may be a digit contacting a surface of the computing system 105. For example, a user may contact a touchscreen display and/or touch sensor and contact information may be generated by the I/O component 106 and sent to the identification component 114. The identification component 114 may receive the contact information and determine object characteristics based on the received contact information at block 204. In some embodiments, the object characteristics may include one or more of the size of the digit, minutiae points of a fingerprint, a thermal characteristic of the contact, a movement of the contact, and a direction of the contact.

At decision block 206 a determination is made as to whether a change in users has occurred. A change in users may be detected based on a comparison between the object characteristics and object characteristics generated by a previous input detected by the I/O component 106. A change factor may be generated based on the comparison. The change factor may be a percentage or number based on the difference between the received object characteristics and object characteristics generated by a previous input.

In various embodiments, a change may occur when the change factor is above a predetermined change threshold. In various embodiments, the predetermined change threshold may be set or configured such that a change in users is detected but a user may not be identified by the object characteristics. For example, the predetermined change threshold may be set to a lower percentage than required to identify a particular user. However, various embodiments are not limited in the manner and the predetermined change threshold may be set to any percentage or number.

At decision block 208, a determination is made as to whether an associated user profile may be determined based on the received object characteristics. In some embodiments, the received object characteristics may be compared to stored object characteristics associated with user profiles and may be used to generate a selection factor for each comparison. If the selection factor is above a predetermined selection threshold, the computing device may switch to using an associated user profile at block 210. However, if the selection factor is not above the predetermined selection threshold, a guest user profile may be enabled at block 212. The computing system 105 may then operate with either the guest user profile or an associated user profile at block 214. In some embodiments, the switching between the user profiles may occur automatically and seamlessly such that a user does not notice that a new user profile has been enabled.

Figure 2B:
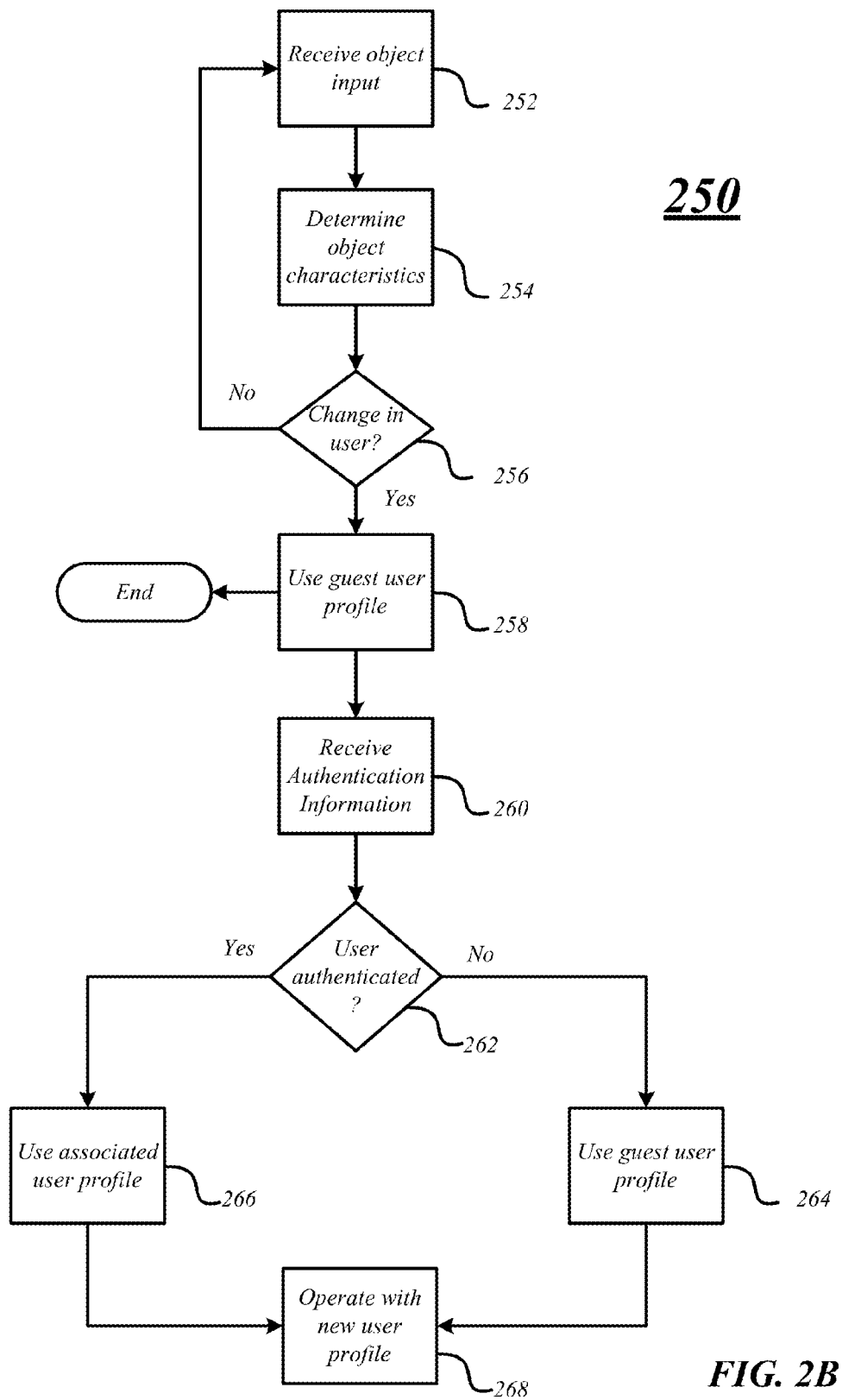
FIG. 2B illustrates an embodiment of a second logic flow diagram for detecting a change in users.

FIG. 2B illustrates an embodiment of a logic flow diagram 250 for determining a change in users and automatically enabling a guest user profile. For clarity purposes, the logic flow is discussed with reference to system 100 of FIG. 1. At block 252, an input is received via the I/O component 106.

In some embodiments, the input may be a digit contacting a surface of the computing system 105. For example, a user may contact a touchscreen display and/or touch sensor and contact information may be generated by the I/O component 106 and sent to the identification component 114. The identification component 114 may receive the contact information and determine object characteristics based on the received contact information at block 254. In some embodiments, the object characteristics may include the size of the digit, minutiae points of a fingerprint, a thermal characteristic of the contact, a movement of the contact, and a direction of the contact.

At decision block 256 a determination is made as to whether a change in users has occurred. A change in users may be detected based on a comparison between the object characteristics and digit characteristics generated by a previous input detected by the I/O component 106. A change factor may be generated based on the comparison. The change factor may be a percentage or number based on the difference between the received object characteristics and object characteristics generated by a previous input.

In various embodiments, a change may occur when the change factor is above a predetermined change threshold. In various embodiments, the predetermined change threshold may be set or configured such that a change in users is detected but a user may not be identified by the object characteristics. For example, the predetermined change threshold may be set to a lower percentage than required to identify a particular user.

If no change in users is detected, the computing system 105 and components wait for the next input received via the I/O component 106 at block 252. However, if the change factor is above a predetermined change threshold, a guest user profile may be enabled at block 258. In various embodiments, the logic flow 200 may end at this point and the computing system 105 may continue to operate using the guest user profile indefinitely or until another change of users is detected. However, in some embodiments, the computing system 105 may request authentication information and receive authentication information via the I/O device 106 and/or camera 110 at block 260. For example, if the computing system 105 is operating under the guest user profile for a time period longer than a time threshold, the profile selection component 116 may require the user to enter authentication information. In another example, a setting may be enabled by an owner or administrator to require the new user to further authenticate using authentication information.

In various embodiments, the authentication information may be received via the I/O component 106 by the identification component 114 at block 260. The authentication information may then be used by the profile selection component 116 to authenticate the user at block 262. If the user is authenticated at decision block 262, the user profile associated with the user is enabled on the computing system 105 by the profile selection component 116 at block 266. However, if the user is not authenticated the computing device continues to operate using the guest user profile at block 264. The computing system 105 continues to operate using either the associated user profile or the guest user profile at block 266 until a new user is detected via an input.

Figure 3:
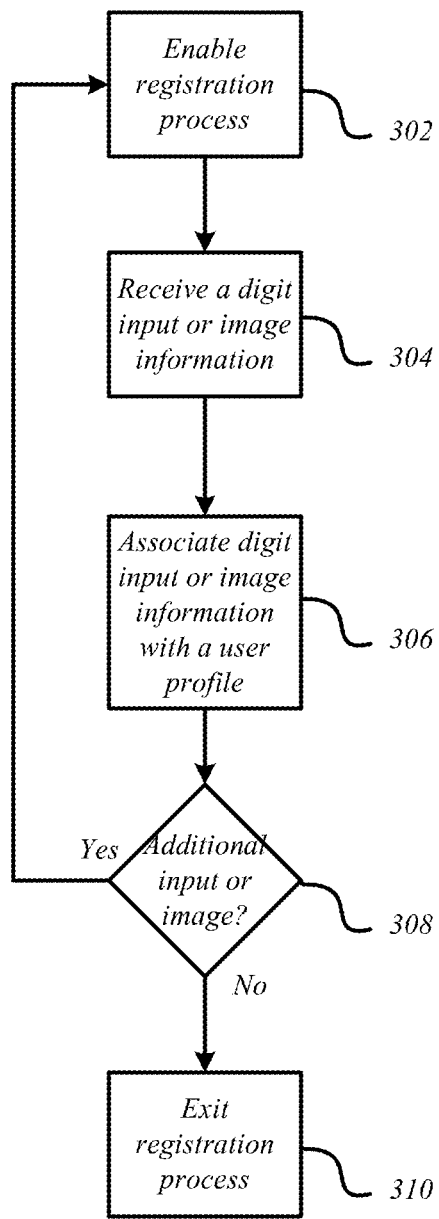
FIG. 3 illustrates an embodiment of a third logic flow diagram for registering user profiles.

FIG. 3 illustrates a logic flow diagram 300 for registering a user on the computing system 105. At block 302 a registration process may be enabled by a user or an administrator. In various embodiments, the user may be required to have the proper privileges, such as administrative privileges, to enable the registration process. At block 304, the I/O component 106 may receive or detect an input, such as a contact of a user's digit on a surface of the computing system 105. For example, a touchscreen display may receive the contact of the digit from the registering user. The contact information may then be sent to the profile registration component 118. In some embodiments, a camera may take a picture of a registering user's face and image information may be sent to the profile registration component 118.

In some embodiments, object characteristics may be determined from the contact information and/or facial characteristics may be determined from the image information. An administrator may then associate the object characteristics and/or facial characteristics with a particular user profile to generate an associated user profile at block 306. The administrator may use a GUI and one or more inputs to associate the characteristics with the user profile. In various embodiments, other authentication information including a password, passkey, password pattern, voice information, biometric information including iris information, facial characteristics and/or fingerprint characteristics may be associated with a user profile.

In embodiments, a determination is made as to whether additional digits or additional facial images are to be registered at decision block 308. In some embodiments, the profile registration component 118 may prompt the administrator via the GUI to continue with the registration process or exit the registration process at block 308. The administrator may then generate one or more inputs to continue or to exit the registration process. If the administrator chooses to continue with the registration process, the logic flow 300 may loop back to block 302 to receive more inputs and information. If the administrator chooses to exit the registration process, the profile registration component 118 will exit the registration process at bock 310.

Figure 4:
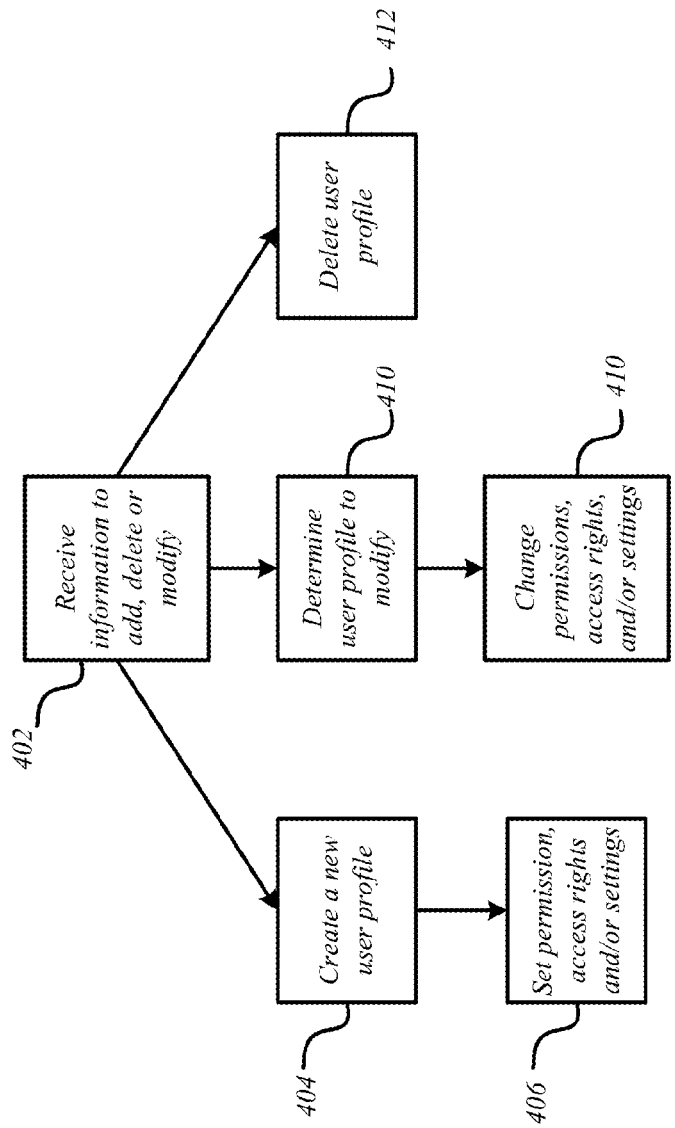
FIG. 4 illustrates an embodiment of a fourth logic flow diagram for managing user profiles.

FIG. 4 illustrates a logic flow diagram 400 for profile management functions. At block 402, the profile management component 112 may receive information to add, delete or modify a user profile. For example, a user or administrator may generate an input via the I/O component 106 to add, delete or modify a user profile via a GUI. At block 404, a new user profile is created when the user or administrator selects or chooses to create a new user profile. At block 406, the administrator or user may select or determine permissions for applications and features. For example, access to particular applications, email clients, sms/mms clients, telephone clients, etc. may be configure for each user profile. In addition, access to certain features may also be configured or enabled/disabled for each user profile including emailing, text messaging, telephonic capabilities, camera capabilities or any other feature of the computing system 105.

At block 408, a user or administrator may modify an existing user profile. For example, a user may generate information via the I/O component 106 using the GUI to modify a user profile. A user or administrator may change permissions for applications and settings via the GUI at block 410. In various embodiments, the user or administrator may change any permissions or settings for each of the user profiles that have been created. The profile management component 112 may receive information via the I/O component 106 and change or modify the user profile.

In various embodiments, at block 412 a user or administrator may delete a user profile via the GUI. The profile management component 112 may receive information to delete a particular user profile via an input generated by a user or administrator. The profile management component 112 may then delete the user profile selected by the user or administrator.

Figure 5A:
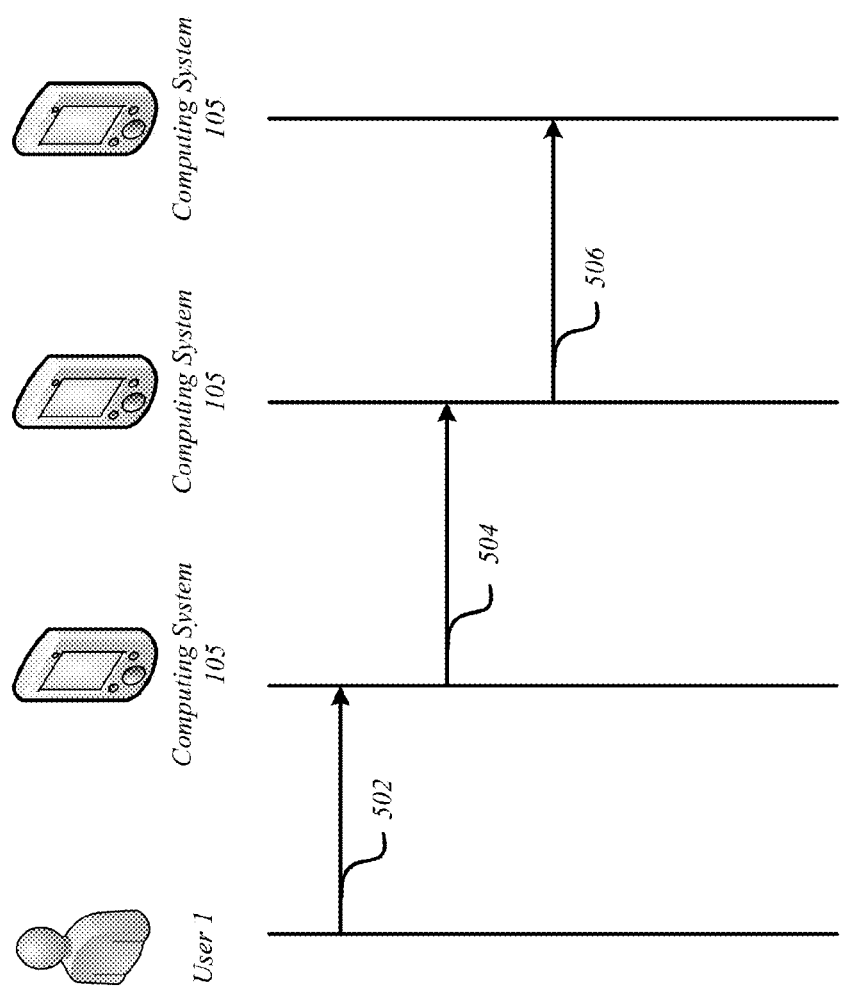
FIG. 5A illustrates an embodiment of a first process flow diagram for detecting a change in users.

FIG. 5 illustrates an embodiment of a first process flow 500. The process flow 500 may be representative of some or all of the operations executed by one or more embodiments described herein. The first process flow 500 illustrates user generating inputs via the I/O component 106. For example a user may generate an input by touching or contacting a surface of the apparatus at line 502. The identification component 114 may receive contact information based on the input and the profile selection component 116 may determine if a new user is using the computing system 105.

At lines 504 and 506, a user may continue to generate contact information by touching or contacting a surface of the computing system 105. For each contact or input, the identification component 114 may generate object characteristics and the profile selection component 116 may determine if a new user is using the computing system 105. In this exemplary embodiment, a new user has not started using the computing system 105. Thus, the same user profile is enabled for the user.

Figure 5B:
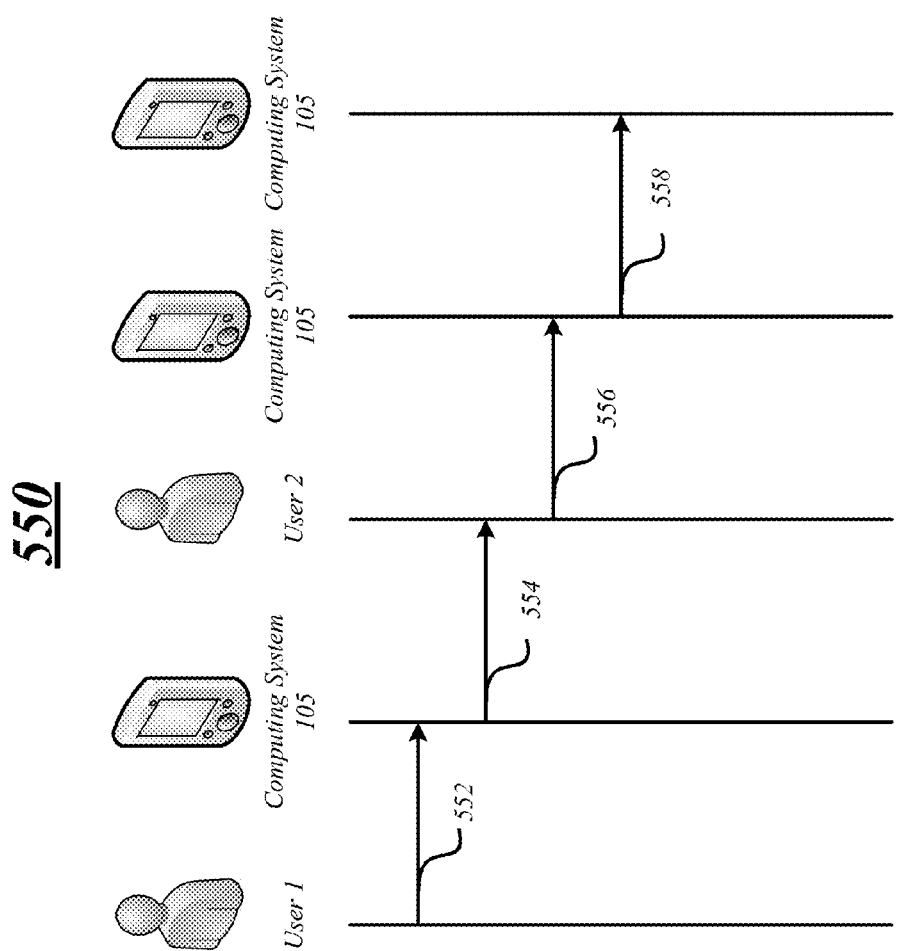
FIG. 5B illustrates an embodiment of a second process flow diagram for detecting a change in users.

FIG. 5B illustrates a second process flow diagram 550 when a different user operates the computing system 105. At line 552 a first user may be generating inputs via the I/O component 106. For example, a user may be contacting or generating inputs via a touchscreen display. For each input, the identification component 114 may generate object information and the profile selection component 116 may determine if the same or different user is operating the computing system 105 at line 554. At line 556 a new user may operate the computing system 105. The identification component 114 may generate object characteristics for the new user and the profile selection 116 may enable a new user profile for the new user based on the object characteristics. In some embodiments, the profile selection component may enable an associated user profile if the new user has a user profile or a guest user profile if the user does not have an associated user profile. At line 558 the computing system 105 may continue to operate with the new user profile until a different user operates the computing system 105.

FIG. 6 illustrates an embodiment of a fourth logic flow 600. The logic flow 600 may be representative of some or all of the operations executed by one or more embodiments described herein. For example, the logic flow 600 may illustrate operations performed by the system 100.

In the illustrated embodiment shown in FIG. 6, the logic flow 600 may include detecting an input comprising a digit contacting a surface of an apparatus. For example, a user may touch or contact a touchscreen display and the I/O component 106 and/or sensor may detect an input based on the contact. The I/O component 106 may then generate contact information based on the input.

At block 610, the identification component 114 may determine object characteristics based on the detected input. For example, the identification component 114 may receive contact information from the I/O component 106 and determine the object characteristics based on the contact information. At block 615, the profile selection component 116 may select a user profile based on the determined object characteristics. For example, the profile selection component 116 may select a new user profile either associated with the user or a guest user profile based on the object characteristics. The computing system 105 may then operate with the new user profile if a different user is operating the device. However, the computing system 105 may operate with same user profile a new user is not detected based on the object characteristics.

Figure 7:
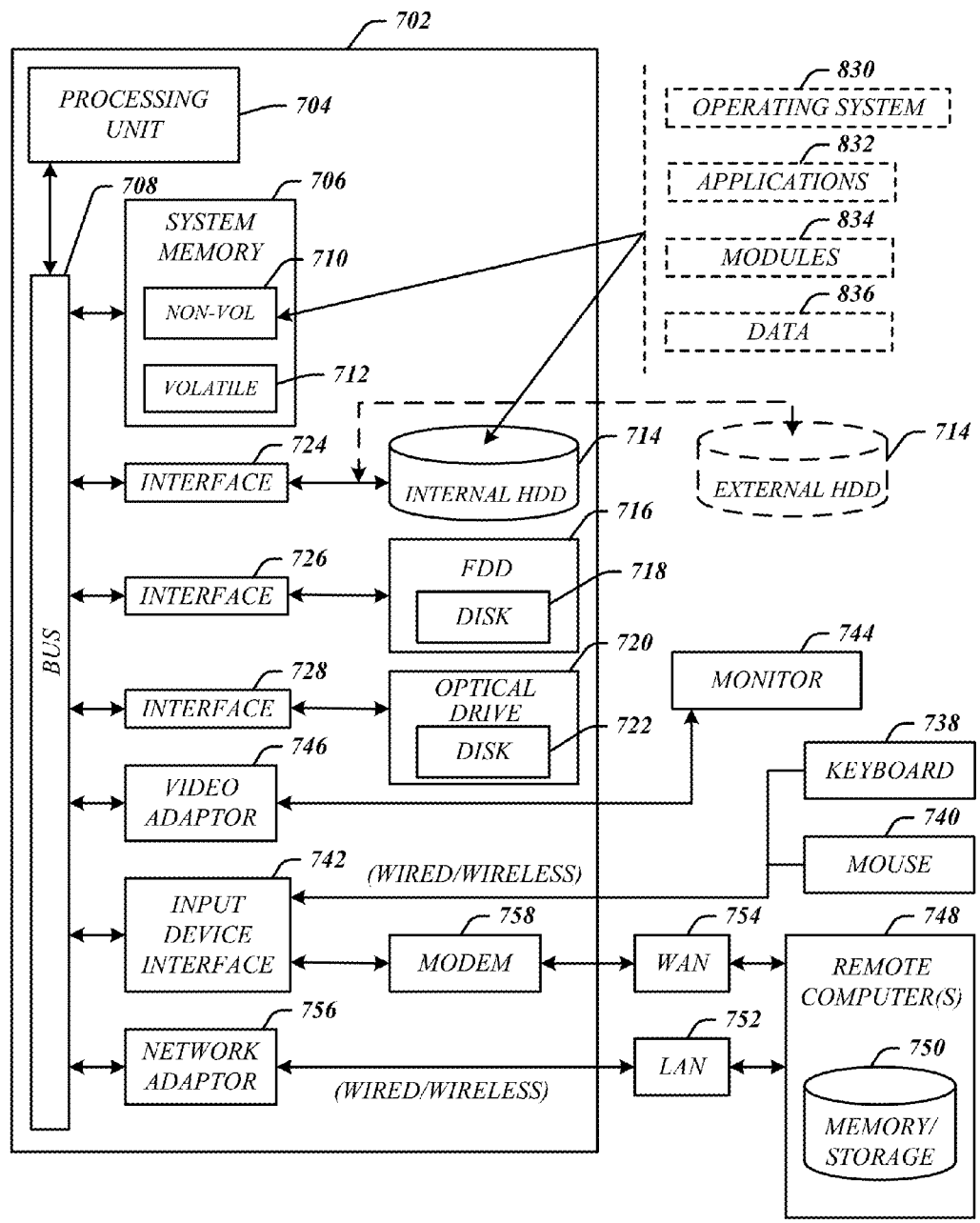
FIG. 7 illustrates an embodiment of a first computing architecture for user identification system.

FIG. 7 illustrates an embodiment of an exemplary computing architecture 700 suitable for implementing various embodiments as previously described. In one embodiment, the computing architecture 700 may comprise or be implemented as part of computing system 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processing component 102 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing system 105 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through 25 (1-25) provided below are intended to be exemplary and non-limiting.

In a first example, an apparatus or computing device may include processing circuitry, a sensor to detect an input comprising a digit contacting a surface of the apparatus, an identification component for execution on the processing circuitry and coupled with the sensor, the identification component to determine object characteristics based on the input and a profile selection component for execution on the processing circuitry and coupled with the sensor and the identification component, the profile selection component to select a user profile based on the object characteristics.

In a second example and in furtherance of the first example, an apparatus or computing device may include a profile selection component to automatically switch from a first user profile to a second user profile when the determined object characteristics indicate a change in users.

In a third example and in furtherance of any of the previous examples, an apparatus or computing device may include the profile selection component to automatically switch from a first user profile to a second user profile when the determined object characteristics indicate a change in users and the determined object characteristics indicate a change in users when the object characteristics based on the input are different than previous object characteristics based on a different input detected by the sensor.

In a fourth example and in furtherance of any of the previous examples, an apparatus or computing device may include the profile selection component to automatically switch from a first user profile to a second user profile when the determined object characteristics indicate a change in users and the second user profile comprising a guest user profile when the determined object characteristics indicating a change in users is not associated with a particular user and the second user profile comprising an associated user profile when the determined object characteristics indicating a change in users is associated with a particular user.

In a fifth example and in furtherance of any of the previous examples, an apparatus or computing device may include a camera coupled with the processing circuitry, the sensor, the identification component and the profile selection component, the camera to receive image information, the identification component to determine facial characteristics based on the received image information and the profile selection component to automatically switch from a first user profile to a second user profile when the determined facial characteristics indicate a user is associated with the second user profile.

In a sixth example and in furtherance of any of the previous examples, an apparatus or computing device may include the profile selection component to automatically switch from a first user profile to a second user profile when the determined object characteristics indicate a change in users and wherein the second user profile restricts access rights to applications and control settings.

In a seventh example and in furtherance of any of the previous examples, an apparatus or computing device may include object characteristics further comprising one or more of a digit length, a digit width and a digit area.

In an eighth example and in furtherance of any of the previous examples, an apparatus or computing device may include a registration component for execution on the processing circuitry and coupled with the sensor, the identification component and the profile selection component, the registration component to receive one or more object characteristics associated with a user during a registration process and a profile management component for execution on the processing circuitry coupled with the sensor, the identification component, the profile selection component and the registration component, the profile management component to associate the one or more object characteristics received during the registration process with a user profile to generate an associated user profile.

In a ninth example and in furtherance of any of the previous examples, an apparatus or computing device may include a profile management component to receive information to add, delete or modify a user profile via an input device and to add, delete or modify the user profile based on the received information.

In a tenth example and in furtherance of any of the previous examples, an article comprising a computer-readable storage medium comprising instructions that when executed enable a computing device to detect an input comprising a digit contacting a surface of an apparatus, determine object characteristics based on the detected input and select a user profile based on the determined object characteristics.

In a eleventh example and in furtherance of any of the previous examples, an article comprising instructions that when executed enable a computing device to automatically switch from a first user profile to a second user profile when the determined object characteristics indicate a change in users.

In a twelfth example and in furtherance of any of the previous examples, the determined object characteristics indicate a change in users when the object characteristics for the input are different than previous object characteristics based on a different input.

In a thirteenth example and in furtherance of any of the previous examples, a the second user profile comprising a guest user profile when the determined object characteristics indicating a change in users is not associated with a particular user and the second user profile comprising an associated user profile when the determined object characteristic indicating a change in users is associated with a particular user.

In a fourteenth example and in furtherance of any of the previous examples, an article comprising a computer-readable storage medium comprising instructions that when executed enable a computing device to receive, by a camera, image information, determine facial characteristics based on the received image information and automatically switch from a first user profile to a second user profile when the determined facial characteristics indicate a user is associated with the second user profile.

In a fifteenth example and in furtherance of any of the previous examples, an article comprising a computer-readable storage medium comprising instructions that when executed enable a computing device to automatically switch from a first user profile to a second user profile when the determined object characteristics indicate a change in users, wherein the second user profile restricts access rights and permissions to applications and control settings.

In a sixteenth example and in furtherance of any of the previous examples, an article comprising a computer-readable storage medium comprising instructions that when executed enable a computing device to detect an input comprising a digit contacting a surface of an apparatus, determine object characteristics based on the detected input and select a user profile based on the determined object characteristics, wherein the object characteristics includes one or more of a digit length, a digit width and a digit area.

In a seventeenth example and in furtherance of any of the previous examples, an article comprising a computer-readable storage medium comprising instructions that when executed enable a computing device to receive one or more object characteristics associated with a user during a registration process and associate the one or more object characteristics received during the registration process with a user profile to generate an associated user profile.

In a eighteenth example and in furtherance of any of the previous examples, an article comprising a computer-readable storage medium comprising instructions that when executed enable a computing device to receive information to add, delete or modify a user profile and add, delete or modify the user profile based on the received information.

In a nineteenth example and in furtherance of any of the previous examples, a computer-implemented method including detecting an input comprising a digit contacting a surface of an apparatus, determining object characteristics based on the detected input and selecting a user profile based on the determined object characteristics.

In a twentieth example and in furtherance of any of the previous examples, a computer-implemented method including to automatically switching from a first user profile to a second user profile when the determined object characteristics indicate a change in users.

In a twenty-first example and in furtherance of any of the previous examples, a computer-implemented method including detecting an input comprising a digit contacting a surface of an apparatus, determining object characteristics based on the detected input and selecting a user profile based on the determined object characteristics, the determined object characteristics indicate a change in users when the object characteristics for the input are different than previous object characteristics based on a different input.

In a twenty-second example and in furtherance of any of the previous examples, a computer-implemented method including detecting an input comprising a digit contacting a surface of an apparatus, determining object characteristics based on the detected input and selecting a user profile based on the determined object characteristics, the second user profile comprising a guest user profile when the determined object characteristics indicating a change in users is not associated with a particular user and the second user profile comprising an associated user profile when the determined object characteristic indicating a change in users is associated with a particular user.

In a twenty-third example and in furtherance of any of the previous examples, a computer-implemented method including receiving, by a camera, image information, determining facial characteristics based on the received image information and automatically switching from a first user profile to a second user profile when the determined indicate a user is associated with the second user profile.

In a twenty-fourth example and in furtherance of any of the previous examples, a computer-implemented method including automatically switching from a first user profile to a second user profile when the determined object characteristics indicate a change in users, wherein the second user profile restricts access rights and permissions to applications and control settings.

In a twenty-fifth example and in furtherance of any of the previous examples, a computer-implemented method including detecting an input comprising a digit contacting a surface of an apparatus, determining object characteristics based on the detected input and selecting a user profile based on the determined object characteristics, wherein the object characteristics includes one or more of a digit length, a digit width and a digit area.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computing device, comprising:
   processing circuitry;
   a touchscreen display to detect an object contact on a surface of the computing device and generate contact information based on the detected object contact;
   an altitude sensor to determine a change in altitude of the computing device;
   an identification circuitry to generate a plurality of object characteristics based at least in part on the contact information and the plurality of object characteristics, wherein the plurality of object characteristics comprises the change in altitude and a size of the object contact based on a digit length, a digit width and a digit area;
   a profile selection circuitry to:
      determine a change factor based on a comparison of the plurality of object characteristics object characteristics and stored object characteristics, and
      select a user profile based on the plurality of object characteristics object characteristics responsive to:
         the change factor being above a predetermined change threshold of 10%, and
         the user profile being stored in a memory component; and
   a registration circuitry to register a user based on learned behavior responsive to an existing user profile associated with the plurality of object characteristics not being stored in the memory component, the learned behavior comprising the plurality of object characteristics received over a number of consecutive inputs.

2. The computing device of claim 1, the profile selection circuitry to automatically switch from a first user profile to a second user profile when the plurality of object characteristics indicate the user is a different user than a first user associated with the first user profile.

3. The computing device of claim 2, the second user profile comprising a guest user profile when the plurality of object characteristics indicate the user is a different user than the first user.

4. The computing device of claim 2, wherein the second user profile restricts access rights to applications and control settings for the user of the computing device.

5. The computing device of claim 1, wherein the plurality of object characteristics comprise at least one of a movement of the object contact and a direction of the object contact.

6. An article comprising a non-transitory computer-readable storage medium comprising instructions that when executed by a system at a computing device cause the system to:
   detect an object contact on a surface of the computing device and generate contact information based on the detected object contact;
   detect a change in altitude of the computing device using an altitude sensor;
   determine a plurality of object characteristics based at least in part on the contact information and the plurality of object characteristics, wherein the plurality of object characteristics comprises the change in altitude and a size of the object contact based on a digit length, a digit width and a digit area;
   determine a change factor based on a comparison of the plurality of object characteristics object characteristics and stored object characteristics;
   select a user profile based on the plurality of object characteristics object characteristics responsive to:
      the change factor being above a predetermined change threshold of 10%, and
      the user profile being stored in a memory component; and
   register a user based on learned behavior responsive to an existing user profile associated with the plurality of object characteristics not being stored in the memory component, the learned behavior comprising the plurality of object characteristics received over a number of consecutive inputs.

7. The article of claim 6, the instructions to cause the system to automatically switch from a first user profile to a second user profile when the plurality of object characteristics indicate the user is a different user than a first user associated with the first user profile.

8. The article of claim 7, the second user profile comprising a guest user profile when the plurality of object characteristics indicate the user is a different user than the first user.

9. The article of claim 7, wherein the second user profile restricts access rights and permissions to applications and control settings for the user of the computing device.

10. The article of claim 6, wherein the plurality of object characteristics comprise at least one of a movement of the object contact and a direction of the object contact.

11. A method implemented at a computing device, comprising:
    detecting an object contact on a surface of the computing device and generate contact information based on the detected object contact;
    detecting a change in altitude of the computing device using an altitude sensor;
    determining a plurality of object characteristics based at least in part on the contact information and the plurality of object characteristics, wherein the plurality of object characteristics comprises the change in altitude and a size of the object contact based on a digit length, a digit width and a digit area;
    determining a change factor based on a comparison of the plurality of object characteristics object characteristics and stored object characteristics;
    selecting a user profile based on the plurality of object characteristics object characteristics responsive to:
       the change factor being above a predetermined change threshold of 10%, and
       the user profile being stored in a memory component; and
    registering a user based on learned behavior responsive to an existing user profile associated with the plurality of object characteristics not being stored in the memory component, the learned behavior comprising the plurality of object characteristics received over a number of consecutive inputs.

12. The method of claim 11, comprising:
    automatically switching from a first user profile to a second user profile when the plurality of object characteristics indicate the user is a different user than a first user associated with the first user profile.

13. The method of claim 12, the second user profile comprising a guest user profile when the plurality of object characteristics indicate the user is a different user than the first user.

14. The method of claim 12, wherein the second user profile restricts access rights and permissions to applications and control settings for the user of the computing device.

15. The method of claim 11, wherein the plurality of object characteristics comprise at least one of a movement of the object contact and a direction of the object contact.

16. The computing device of claim 1, comprising an altitude sensor to determine an altitude of the computing device, the one or more object characteristics comprising a change in the altitude of the computing device.

17. The computing device of claim 1, the registration component to generate a user profile for a current user responsive to a plurality of same or similar object characteristics received over the number of consecutive inputs.

* * * * *